(12) United States Patent
Duncan et al.

(10) Patent No.: US 8,239,179 B2
(45) Date of Patent: Aug. 7, 2012

(54) GEOSPATIAL MODELING SYSTEM USING SINGLE OPTICAL IMAGES AND ASSOCIATED METHODS

(75) Inventors: Gilbert C. Duncan, Las Cruces, NM (US); Elizabeth Cook, Orlando, FL (US)

(73) Assignee: Harris Corporation, Melbourne, FL (US)

( * ) Notice: Subject to any disclaimer, the term of this patent is extended or adjusted under 35 U.S.C. 154(b) by 339 days.

(21) Appl. No.: 12/637,257

(22) Filed: Dec. 14, 2009

(65) Prior Publication Data

US 2011/0144954 A1 Jun. 16, 2011

(51) Int. Cl.
*G06G 7/48* (2006.01)
(52) U.S. Cl. .......................................................... 703/6
(58) Field of Classification Search ....................... 703/6
See application file for complete search history.

(56) References Cited

U.S. PATENT DOCUMENTS

| 6,229,546 | B1 | 5/2001 | Lancaster et al. ............. 345/419 |
| 7,528,939 | B2 | 5/2009 | Van Kessel ..................... 356/72 |
| 2009/0015674 | A1 | 1/2009 | Alley et al. |
| 2009/0027417 | A1 | 1/2009 | Horsfall et al. |

OTHER PUBLICATIONS

Kumar et al.; Aerial Video Surveillance and Exploitation; Proceedings of the IEEE, vol. 89, No. 10, Oct. 2001; pp. 1518-1539.*
Related WIPO search, 2011.*
Imagine OrthoBASE Tour Guide ERDAS Imagine V8.4; product guide, 1999, pp. 1-224.*
Pope et al., "Video Abstraction: Summarizing Video Content for Retrieval and Visualization", IEEE, vol. 1, Nov. 1998, pp. 915-919.
Bennett et al., "Computational Time-Lapse Video", ACM Transactions on Graphics, vol. 26, No. 3, Jul. 2007, pp. 102-1-102-6.

* cited by examiner

*Primary Examiner* — Hugh Jones
(74) *Attorney, Agent, or Firm* — Allen, Dyer, Doppelt, Milbrath & Gilchrist, P.A.

(57) ABSTRACT

A geospatial modeling system includes a display, a geospatial database, and a processor. The processor generates a model based upon a single optical image and a digital elevation model (DEM), and without registration of multiple optical images. The processor also generates time-lapsed models based upon single time-lapsed optical images and the DEM, and without registration of multiple time-lapsed optical images. Regions of interest are user selected from the time-lapsed models, and are displayed along with the model.

20 Claims, 5 Drawing Sheets

GEOSPATIAL MODELING SYSTEM USING SINGLE OPTICAL IMAGES AND ASSOCIATED METHODS

FIELD OF THE INVENTION

The present invention relates to the field of image processing, and more particularly, to geospatial image processing and related methods.

BACKGROUND OF THE INVENTION

Topographical models of geographical areas may be used for many different applications. For example, topographical models may be used for flight simulators, urban planning, disaster preparedness and analysis, mapping, and military mission planning.

One common topographical model is the digital elevation map (DEM). A DEM is a sampled matrix representation of a geographical area that may be generated in an automated fashion by a computer. In a DEM, coordinate points are made to correspond with a height value.

There are two types of elevation models: a digital terrain model, and a digital surface model. A digital terrain model is also known as a bare earth model, which is a DEM that contains no manmade objects or vegetation. A digital surface model is also known as a reflective surface model, which is a DEM that contains manmade objects and vegetation.

Regions of interest (ROI) are specific objects within an area of interest (AOI) that are being modeled. Regions of interest are also known as regions, and include manmade objects and vegetation, such as buildings, aircraft, boats and different types of terrain.

User demand for three-dimensional (3D) models has grown steadily over the past several years. More recently, the need for "time critical" 3D models for situational awareness has become the more common need. Current model generation methods may not be cost effective and may require a considerable amount of processing time/resources, which makes these products impractical for some users.

Although users have become accustomed to lengthy turnaround times for 3D models, they tend to look for alternatives to shorten delivery time. Lengthy turnaround occurs for several reasons. For instance, searching for and acquiring two or more ideal images is time consuming, and the ideal images may not even exist. Registration of multiple images often takes a significant amount of time, which involves matching the points of a source image with all corresponding images. Manually drawing all the necessary regions takes time. Generation of multiple images is a long process since it involves more permutations per image. Moreover, there are instances where models need further editing for missing textures.

Accordingly, U.S. Pat. No. 6,229,546 discloses a geospatial image processing system wherein a terrain model may be rapidly generated with 3D object features. In particular, a secondary formatting process creates the generated world model as a series of instructions to populate the colored terrain skin, where appropriate, with 3D objects that simulate natural and man-made object features. However, depending on the application, simulated features may not be sufficient.

Change detection may be an important part of many geospatial image processing systems. Given the recent explosion of available imagery data and the increasing number of areas-of-interest throughout the world, the trend is towards rapid, automated change detection algorithms. U.S. Pat. No. 7,528,939 discloses an image change detecting system. The '939 patent is assigned to the current assignee of the present invention, and is hereby incorporated by reference. The image change detecting system includes an image processor cooperating with a geospatial scene model database for generating a reference geospatial image corresponding to the collected geospatial image, and a change detector cooperating with the image processor for detecting a change between the collected geospatial image and the reference geospatial image.

Notwithstanding the advances made in geospatial image processing systems, as well as in change detection associated therewith, there is still a need to improve the turnaround times for providing this information to a user.

SUMMARY OF THE INVENTION

In view of the foregoing background, it is therefore an object of the present invention to reduce the amount of processing time when generating geospatial models using a geospatial modeling system.

This and other objects, features, and advantages in accordance with the present invention are provided by a geospatial modeling system comprising a display, a geospatial database, and a processor cooperating with the geospatial database and the display. The processor generates a model based upon a single optical image and a digital elevation model (DEM) and without registration of multiple optical images. The processor generates a time-lapsed model based upon a single time-lapsed optical image and the DEM, and without registration of multiple time-lapsed optical images. Although one time-lapsed model is generated based on a single time-lapsed optical image and the DEM, the processor may generate more than one (i.e., at least one) time-lapsed model based upon one or more (i.e., at least one) single time-lapsed optical images and the DEM, all without registration of multiple time-lapsed optical images.

Since registration of multiple optical images is not necessary, the amount of processing time to generate the model may be significantly reduced. Likewise, since registration of multiple time-lapsed optical images is not necessary, the amount of processing time to generate the time-lapsed models may also be significantly reduced.

The processor also permits user selection of a region of interest in the time-lapsed model, and displays the model and the region of interest from the time-lapsed model. The processor is further configured to store in the geospatial database the region of interest from the time-lapsed model and not the entire time-lapsed model.

The regions of interest have an intelligence value when displayed with the model. An advantage of storing the regions of interest as compared to storing the entire time-lapsed models is in reduced memory requirements. Each stored region of interest may typically be in megabytes, for example, as compared to terabytes for a stored time-lapsed model. Moreover, each region of interest may be stored as a file in a directory in a typical Windows® based personal computer, for example.

The at least one time-lapsed model may comprise a plurality of time-lapsed models. The processor may modify the region of interest in the time-lapsed model. The modifying may comprise at least one of height and texturing adjustments.

The processor further removes user selected areas from the model, modifies the user selected areas, and inserts the modified user selected areas back into the model to create an enhanced model. The display by the processor comprises overlaying the region of interest on the model. The region of interest may have metadata associated therewith so that the processor determines placement thereof on the model based on the metadata. The region of interest may comprise a non-stationary object, for example.

Alternatively, the region of interest in the time-lapsed model may correspond to a same region of interest in the model. Display by the processor comprises positioning the region of interest laterally adjacent the model. This may be done to create a timeline for the user to view along with the model.

Another aspect is directed to a processor for a geospatial modeling system as described above. A first module is configured to generate a model based upon a single optical image and a DEM and without registration of multiple optical images. A second module is configured to generate a time-lapsed model based upon a single time-lapsed optical image and the DEM and without registration of multiple time-lapsed optical images. A third module is configured to permit user selection of at least one region of interest in the time-lapsed model. A fourth module is configured to display the model and the at least one region of interest from the time-lapsed model.

Yet another aspect is directed to a method for operating a geospatial modeling system as described above.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
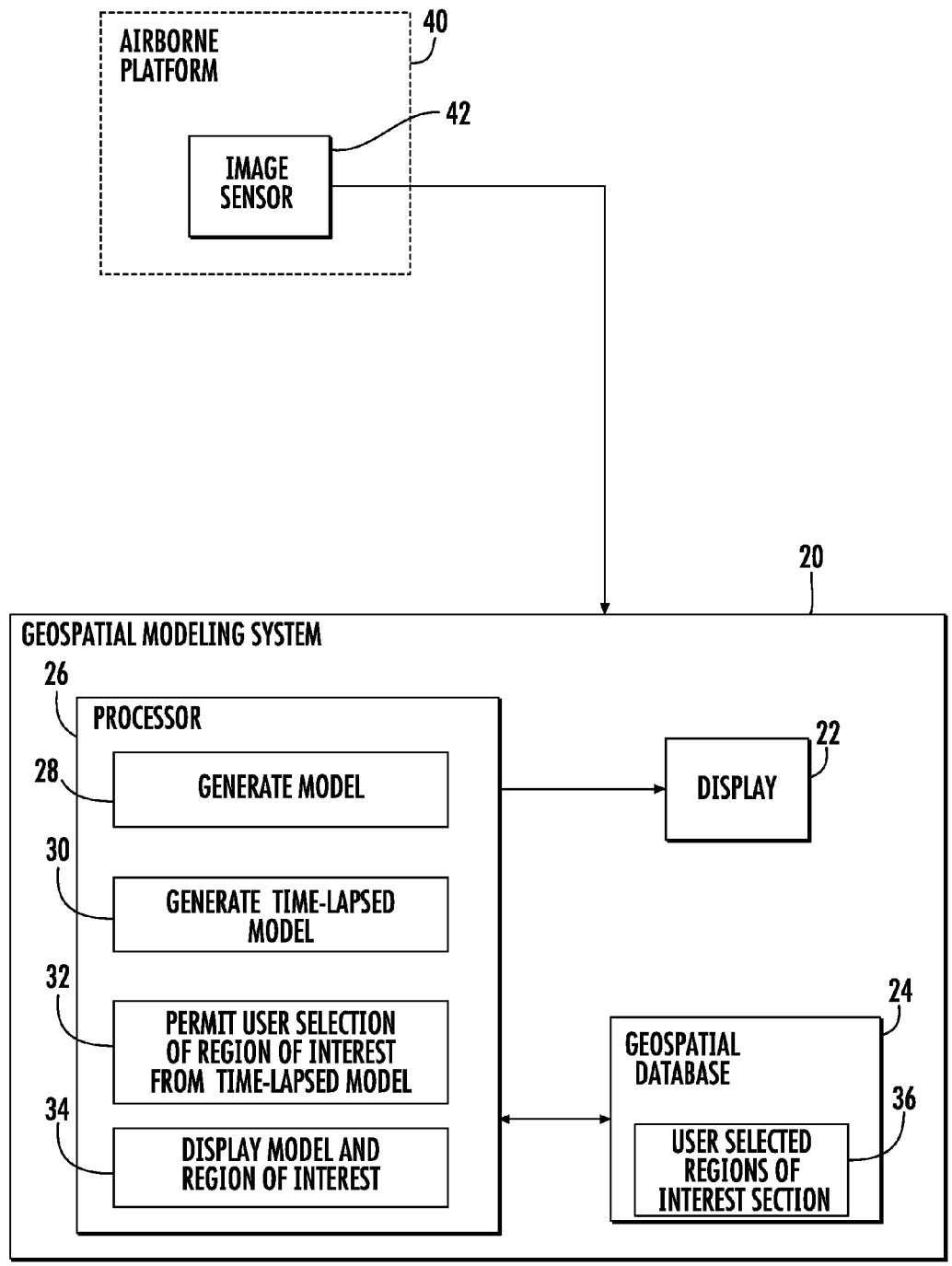
FIG. 1 is a block diagram of a geospatial modeling system in accordance with the present invention.

Referring initially to FIG. 1, a geospatial modeling system 20 comprises a display 22, a geospatial database 24 and a processor 26 cooperating with the geospatial database and the display. The geospatial modeling system 20 is used to generate a model and one or more time-lapsed models. User selected regions of interest from the time-lapsed models may be collected and stored over a period of time. The user selected regions of interest may then be displayed along with the model to provide situational awareness to the user. The regions of interest may be stationary or non-stationary objects, for example. As will be explained in greater detail below, the models and time-lapsed models may be generated with a reduced amount of processing time since registration is not required with multiple optical images.

More particularly, the processor 26 includes a first module 28 to generate the model based upon a single optical image and a digital elevation model (DEM), and without registration of multiple optical images. Since registration of multiple optical images is not necessary, the amount of processing time to generate the model may be significantly reduced. The first module 28 orthorectifies the single optical image with the DEM to generate the model. Since a DEM is involved, the resulting model is three-dimensional (3D).

The optical images may be generated by an image sensor 42 carried by an airborne platform 40. As will be appreciated by those skilled in the art, the airborne platform 40 may be an airplane, helicopter, unmanned aerial device, lighter-than-air aircraft, satellite, etc. Alternatively, a ground-based platform carrying the image sensor 42 may be used.

After the model has been generated, time-lapsed optical images corresponding to the model are collected from the airborne platform 40. For each time-lapsed optical image, the processor 26 includes a module 30 to generate a time-lapsed model based upon that particular time-lapsed optical image and the DEM, and without registration of multiple time-lapsed optical images. Since registration of multiple time-lapsed optical images is not necessary, the amount of processing time to generate the time-lapsed models may be significantly reduced. As with generation of the model, the second module 30 orthorectifies a single time-lapsed optical image with the DEM to generate a time-lapsed model. The same DEM is used for the model as well as for each of the time-lapsed models.

The processor 26 includes a third module 32 to permit user selection of at least one region of interest for each time-lapsed model. Consequently, when each time-lapsed model is generated, only the user selected regions of interest need to be stored in a region of interest section 36 within the geospatial database 24. This advantageously reduces memory size requirements for the geospatial database 24. Alternatively, if memory size is not a constraint, then the entire time-lapsed models may be stored in the geospatial database 24.

The processor 26 includes a fourth module 34 to display the model and the regions of interest 36 stored in the geospatial database 24. The user-selected regions of interest provide the situational awareness information to the user when displayed with the model.

Referring now additionally to FIGS. 2-5, illustrated examples of operation of the geospatial modeling system 20 will be discussed. In these examples, the user wants to track activity over a specified area of interest (e.g., an airport), with an emphasis on a region of interest (e.g., activity of a particular type aircraft on the tarmac). The activity is not limited to any time duration, but for illustration purposes, there will be four different sightings of the region of interest over a two week period. The first sighting is in the model 50 itself. Operation of the geospatial modeling system 20 may be broken down into four stages: Rapid, Enhanced, Archival and Detection (READ).

Figure 2:
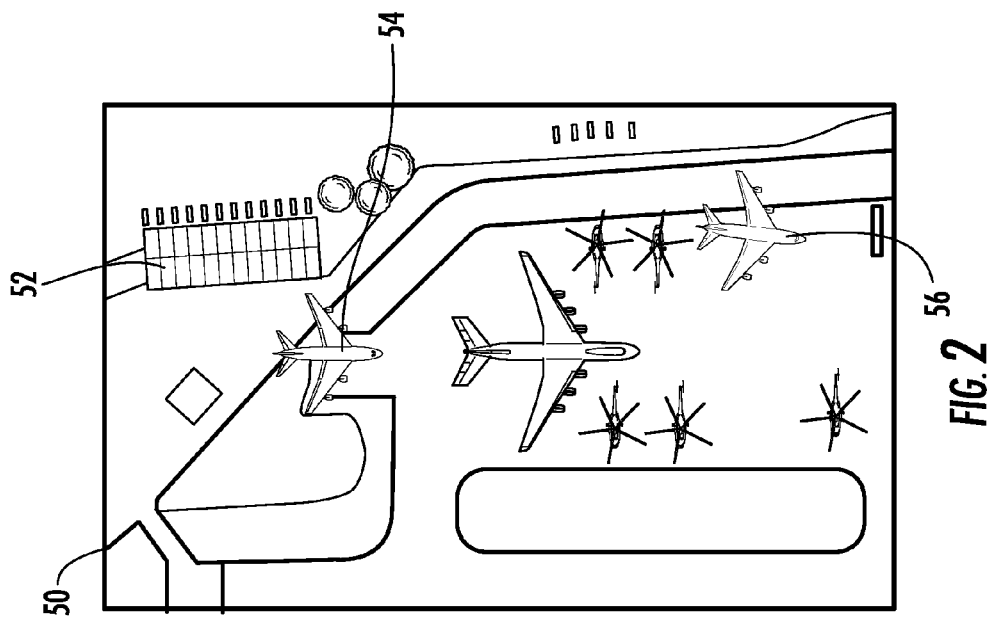
FIG. 2 is a display of a model generated by the geospatial modeling system as shown in FIG. 1.

The model 50 is generated in the rapid stage, as illustrated in FIG. 2. The specified area of interest in the model 50 is an airport. As discussed above, the model 50 is advantageously generated based upon a single optical image and a digital elevation model, and without registration of multiple optical images. This allows for a rapid completion of the model, preferably within the same day. Moreover, the use of a single optical image allows the user to choose the one best image meeting the current modeling specifications. This is in contrast to the user having to find two or more images of equal quality that also meet the current modeling specifications, wherein the two or more images would require registration.

However, there is a tradeoff in speed of generating the model 50 versus the quality of the model since registration between multiple optical images is not being performed. For example, the hanger 52 and two of the aircraft 54, 56 appear washed out. That is, they are not textured and lack detail. Consequently, the next stage is to enhance or modify the model 50.

Figure 3:
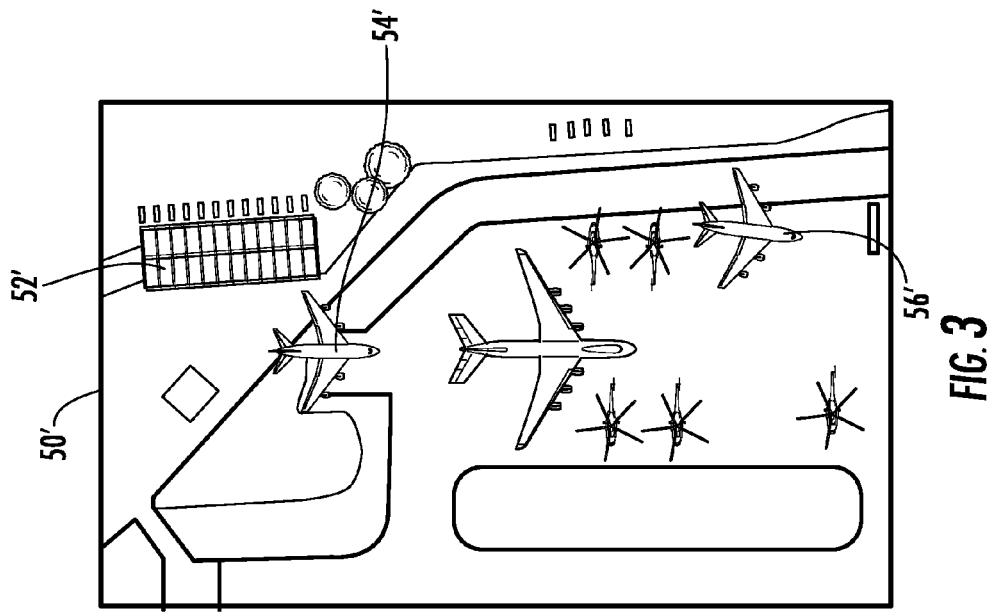
FIG. 3 is a display of the model shown in FIG. 2 after enhancement by the geospatial modeling system as shown in FIG. 1.

To enhance or modify the washed out areas in the model 50, the user individually chips out or removes these areas from the model 50. Each individually chipped out area is enhanced and then re-inserted back into the model 50. The model 50' after enhancement is shown in FIG. 3. The hanger 52' and the aircraft 54', 56' are noticeably more detailed.

Enhancing includes at least one of height and texturing adjustments, as readily appreciated by those skilled in the art. Each area that is chipped out has metadata associated therewith. Metadata includes latitude, longitude, elevation information on where the area is to be placed when re-inserted back into the model 50' as will be appreciated by those skilled in the art.

An advantage of chipping out just the hanger 52 and not the area around the hanger is that the hanger can be more effectively enhanced. If the hanger 52 and the area around the hanger were selected at the same time to be enhanced, an algorithm would typically extrapolate or average pixel values adjacent the edges of the hanger 52 due to the contrasting values at the edges. The resulting pixel values are not as enhanced as when just the outline of the hanger 52 is chipped out. Likewise, aircraft 54 and 56 are each individually chipped out and enhanced, and then re-inserted back into the enhanced model 50'.

The next stage is archival, which involves storing regions of interest from time-lapsed optical images. The stored regions of interest can then be later retrieved and displayed with the enhanced model 50' to provide situation awareness information to the user. In the illustrated example, the region of interest is aircraft 56'. Of course, more than one region of interest may be tracked, but for clarity of explanation, only one region is tracked. In this example, the region of interest is a non-stationary object.

Figure 4:
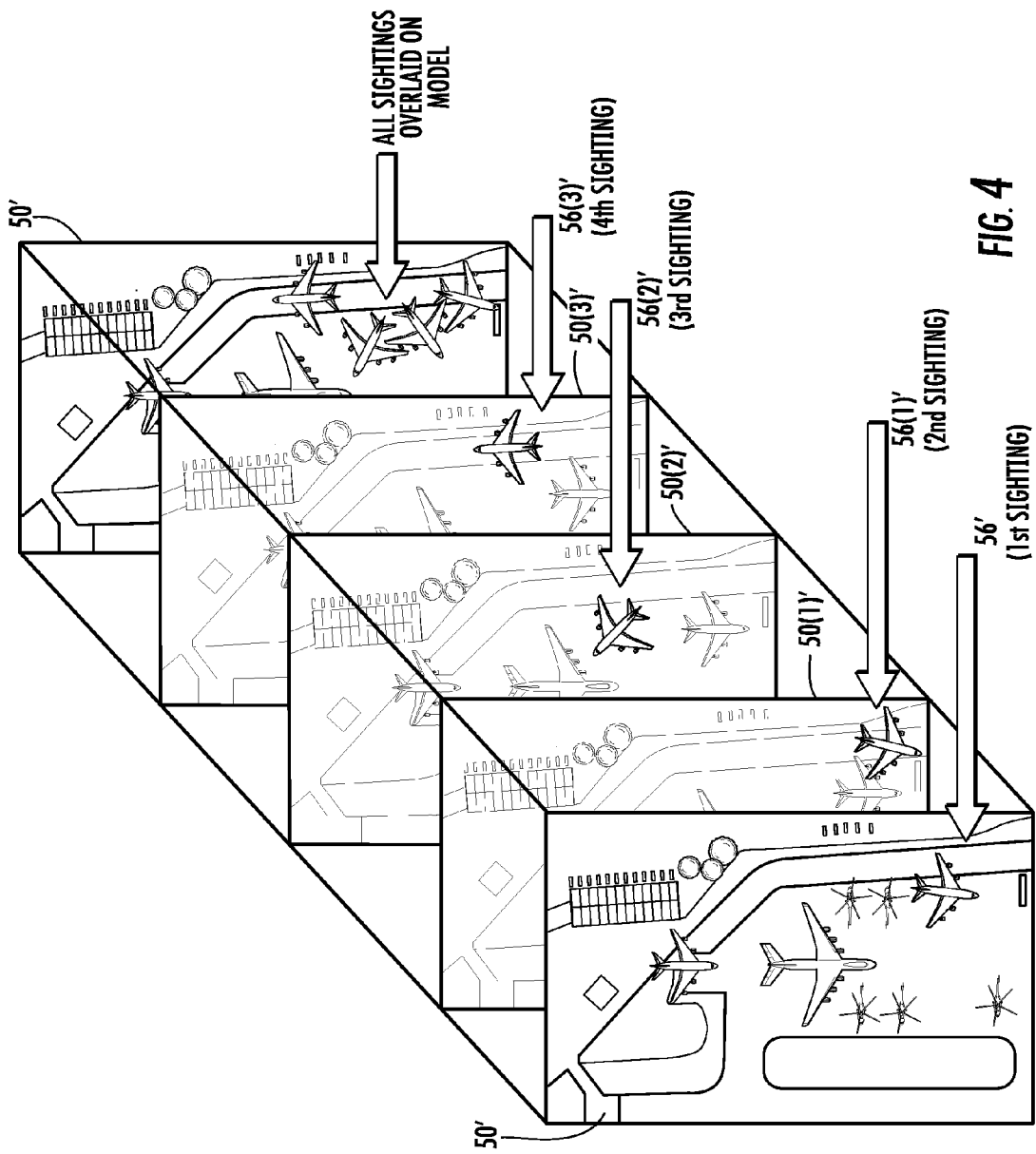
FIG. 4 is a series of displays of the enhanced model and enhanced time-lapsed models generated by the geospatial modeling system as shown in FIG. 1.

As illustrated in FIG. 4, the first sighting of the aircraft 56' is provided in the enhanced model 50'. After generation of the enhanced model 50', three enhanced time-lapsed models 50(1)', 50(2)', 50(3)' are generated. Each enhanced time-lapsed model 50(1)', 50(2)', 50(3)' is generated at different points in time, and corresponds to a respective time-lapsed optical image and the DEM.

As with the enhanced model 50', the time-lapsed models 50(1)', 50(2)', 50(3)' may also be enhanced. However, since the focus of attention is on just the region of interest in each time-lapsed model and not the entire time-lapsed model, enhancement to the time-lapsed models can be limited to the regions of interest therein. Enhancement to the region of interest may be while the region of interest is in the time-lapsed model. This avoids having to remove the region of interest, enhance it, and then re-insert enhanced region of interest back into the time-lapsed model.

After enhancement to the regions of interest, i.e., aircraft 56(1)', 56(2)', 56(3)', they may be removed from their respective time-lapsed models 50(1)', 50(2)', 50(3)' for storage within the region of interest section 36 in the geospatial database 24.

Alternatively, enhancement to the regions of interest may be made after their removal from their respective time-lapsed models 50(1)', 50(2)', 50(3)'. After enhancement, then the aircraft 56(1)', 56(2)', 56(3)' may be stored within the region of interest section 36 in the geospatial database 24 as discussed above.

The chipped out aircraft 56(1)', 56(2)', 56(3)' have an intelligence value when displayed with the enhanced model 50'. Since only one model and DEM are needed by the geospatial modeling system 20, costs can be significantly reduced. Another advantage of storing the chipped out regions of interest as compared to storing the area of interest (that includes the regions of interest) is in reduced memory requirements. Each stored region of interest 56(1)', 56(2)', 56(3)' is typically in megabytes, as compared to terabytes for a stored area of interest. Moreover, each stored region of interest 56(1)', 56(2)', 56(3)' may be configured as a file for storage in a typical Windows® based personal computer, for example.

Figure 5:
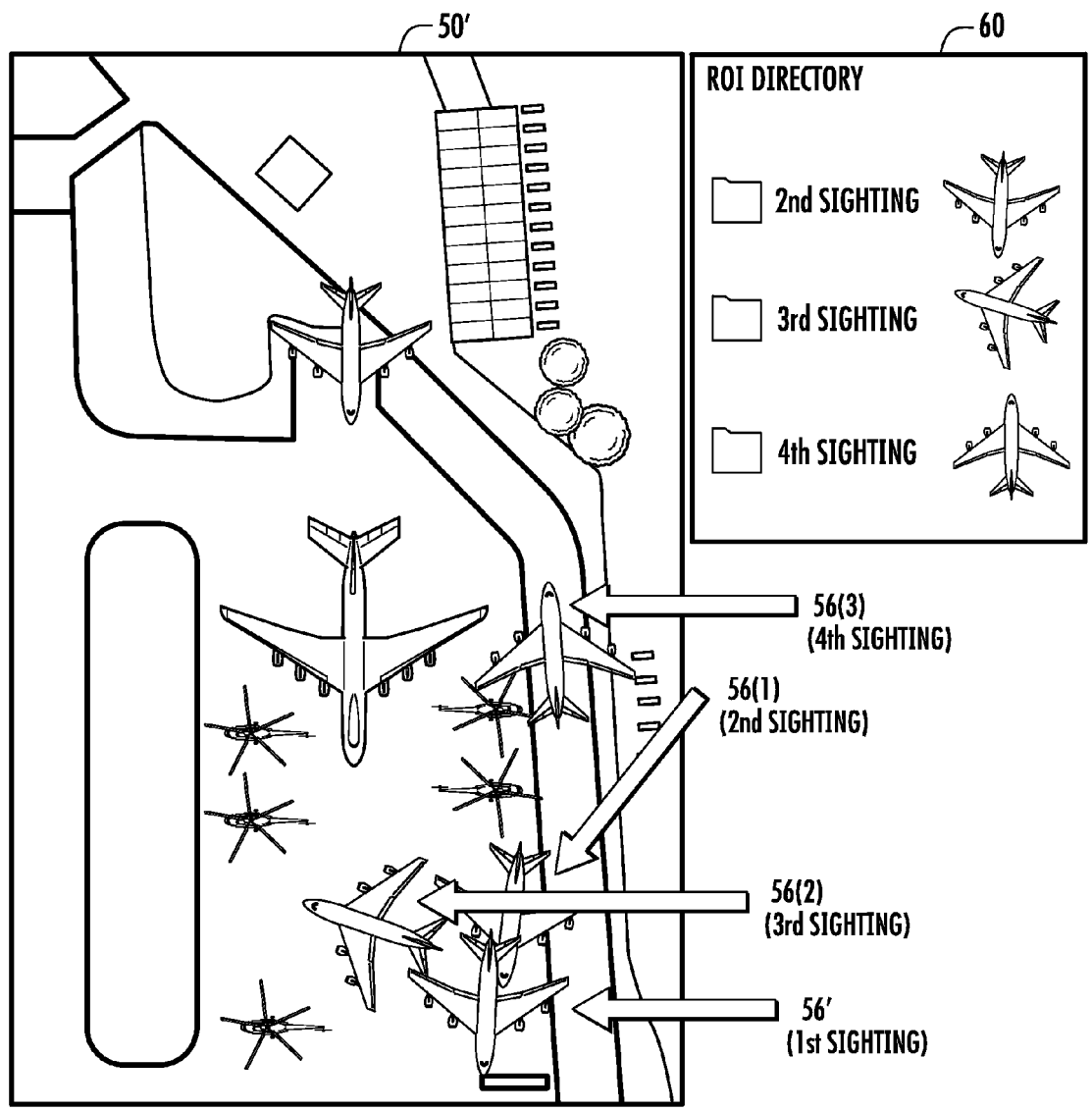
FIG. 5 is a display of the enhanced model and user-selected regions of interest generated by the geospatial modeling system as shown in FIG. 1.

The final stage is detection, which involves displaying the stored regions of interest 56(1)', 56(2)', 56(3)' along with the enhanced model 50'. Since the regions of interest are non-stationary, they are overlaid on the enhanced model 50'. As best shown in FIG. 5, the enhanced model 50' includes the first or initial sighting of the aircraft 56' as well as the enhanced time-lapsed sightings of the aircraft 56(1)', 56(2)', 56(3)'. As a result of overlaying the different sightings of the aircraft 56', the user is able to quickly determine the activity of that aircraft over a monitored period of time.

To overlay the aircraft 56(1)', 56(2)', 56(3)' on the enhanced model 50', the user may select each stored region of interest from a directory. As illustrated, the directory 60 includes the second, third and fourth sightings of the aircraft 56', which correspond to regions of interest 56(1)', 56(2)', 56(3)'. Since each stored sighting has metadata associated therewith, overlay onto the enhanced model 50' is based on the metadata, as will be appreciated by those skilled in the art.

If the regions of interest are stationary objects, then the regions of interest are displayed by positioning them adjacent the enhanced model 50'. For example, the region of interest being monitored may be fixed location, such as a field. The field may be monitored during the growing seasons. By displaying the regions of interest, i.e., the field, next to the enhanced model, a timeline is provided to the user. The user can easily understand changing conditions of the field based on the timeline.

Figure 6:
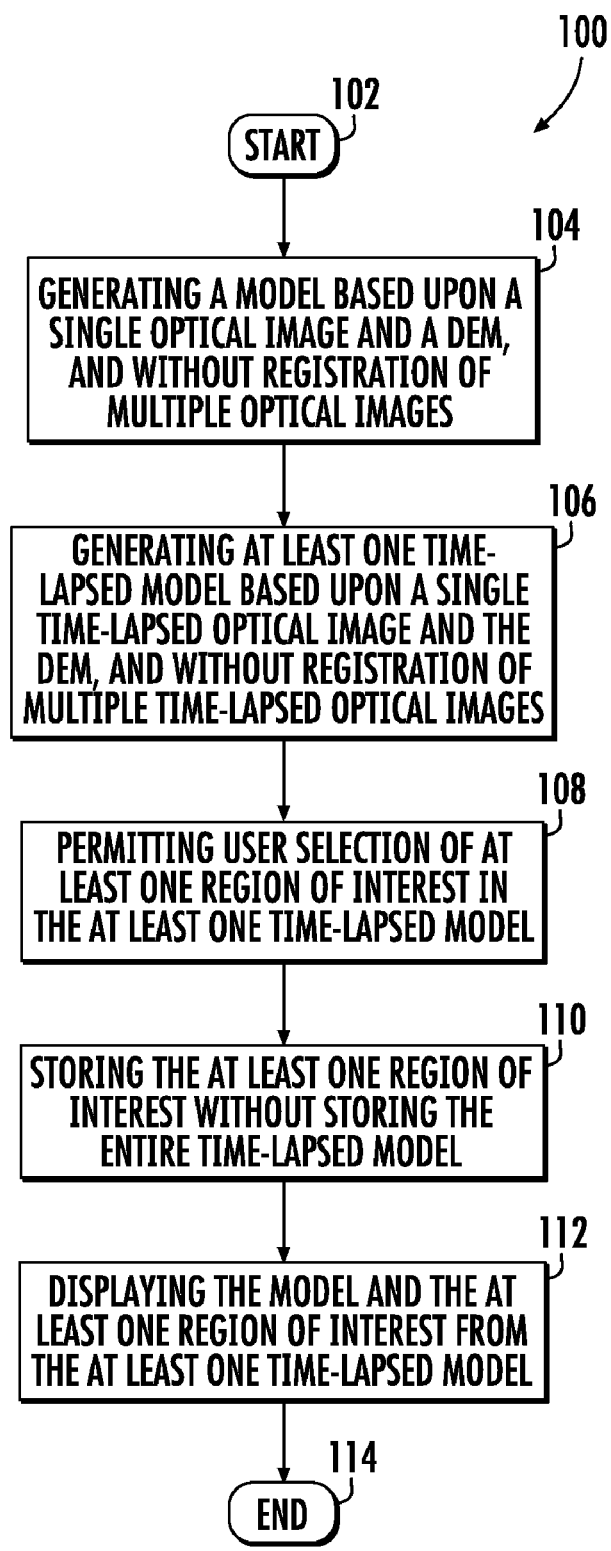
FIG. 6 is a flowchart of a method for operating the geospatial modeling system as shown in FIG. 1.

Another aspect is directed to a method for operating a geospatial modeling system 20 as described above. Referring now to the flowchart 100 in FIG. 6, the method comprises from the start (Block 102), generating a model 50' based upon a single optical image and a digital elevation model and without registration of multiple optical images at Block 104. At Block 106, at least one time-lapsed model 50(1)' is generated based upon at least one single time-lapsed optical image and the DEM and without registration of multiple time-lapsed optical images. User selection of at least one region of interest 56(1)' in the at least one time-lapsed model 50(1)' is permitted at Block 108. At least one region of interest 56(1)' from the at least one time-lapsed model 50(1)' and not the entire at least one time-lapsed model is stored in the geospatial database 24 at Block 110. The method further comprises at Block 112 displaying the model 50' and the at least one region of interest 56(1)' from the at least one time-lapsed model. The method ends at Block 114.

Many modifications and other embodiments of the invention will come to the mind of one skilled in the art having the benefit of the teachings presented in the foregoing descriptions and the associated drawings. Therefore, it is understood that the invention is not to be limited to the specific embodi- That which is claimed is:

1. A geospatial modeling system comprising:
a display;
a geospatial database; and
a processor cooperating with said geospatial database and said display and configured to:
generate a model based upon a single optical image and a digital elevation model (DEM) and without registration of multiple optical images, with the single optical image including at least one initial region of interest;
generate a time-lapsed model based upon a single time-lapsed optical image and the DEM and without registration of multiple time-lapsed optical images;
permit user selection of at least one region of interest in the time-lapsed model; and
display the model along with the at least one initial region of interest and the at least one region of interest from the time-lapsed model to provide situational awareness.

2. The geospatial modeling system according to claim 1 wherein said processor is further configured to store in said geospatial database the at least one region of interest from the time-lapsed model and not the entire time-lapsed model.

3. The geospatial modeling system according to claim 1 wherein said processor is further configured to permit user modification of the at least one region of interest in the time-lapsed model.

4. The geospatial modeling system according to claim 3 wherein the user modification comprises at least one of height and texturing adjustments.

5. The geospatial modeling system according to claim 1 wherein said processor is further configured to:
remove user selected areas from the model;
permit user modification of the removed user selected areas; and
permit user insertion of the modified selected areas back into the model.

6. The geospatial modeling system according to claim 1 wherein the display by said processor comprises overlaying the at least one region of interest on the model.

7. The geospatial modeling system according to claim 6 wherein the at least one region of interest has metadata associated therewith, and wherein said processor determines placement of the at least one region of interest on the model based on the metadata.

8. The geospatial modeling system according to claim 1 wherein the at least one region of interest in the time-lapsed model corresponds to a same region of interest in the model, and wherein the display by said processor comprises positioning the at least one region of interest laterally adjacent the model.

9. A processor for a geospatial modeling system comprising:
a first module configured to generate a model based upon a single optical image and a digital elevation model (DEM) and without registration of multiple optical images, with the single optical image including at least one initial region of interest;
a second module configured to generate a time-lapsed model based upon a single time-lapsed optical image and the DEM and without registration of multiple time-lapsed optical images;
a third module configured to permit user selection of at least one region of interest in the time-lapsed model; and
a fourth module configured to display the model along with the at least one initial region of interest and the at least one region of interest from the time-lapsed model to provide situational awareness.

10. The processor according to claim 9 wherein said third module is further configured to store in a geospatial database the at least one region of interest from the time-lapsed model and not the entire time-lapsed model.

11. The processor according to claim 9 wherein said second module is further configured to permit user modification of the at least one region of interest in the time-lapsed model.

12. The processor according to claim 9 wherein said first module is further configured to:
remove user selected areas from the model;
permit user modification of the removed user selected areas; and
permit user insertion of the modified selected areas back into the model.

13. The processor according to claim 9 wherein said fourth module is further configured to overlay the at least one region of interest on the model.

14. The processor according to claim 13 wherein the at least one region of interest has metadata associated therewith, and wherein said fourth module determines placement of the at least one region of interest on the model based on the metadata.

15. A method for operating a geospatial modeling system comprising a display and a processor cooperating with the display, the method comprising:
operating the processor to
generate a model based upon a single optical image and a digital elevation model (DEM) and without registration of multiple optical images, with the single optical image including at least one initial region of interest;
generate a time-lapsed model based upon a single time-lapsed optical image and the DEM and without registration of multiple time-lapsed optical images;
permit user selection of at least one region of interest in the time-lapsed model; and
display the model along with the at least one initial region of interest and the at least one region of interest from the time-lapsed model on the display to provide situational awareness.

16. The method according to claim 15 further comprising storing in a geospatial database the at least one region of interest from the time-lapsed model and not the entire time-lapsed model.

17. The method according to claim 15 further comprising modifying the at least one region of interest in the time-lapsed model.

18. The method according to claim 15 wherein generating the model comprises:
removing user selected areas from the model;
modifying the removed user selected areas; and
inserting the modified selected areas back into the model.

19. The method according to claim 15 wherein the displaying comprises overlaying the at least one region of interest on the model.

20. The method according to claim 19 wherein the at least one region of interest has metadata associated therewith, and wherein the displaying comprises determining placement of the at least one region of interest on the model based on the metadata.

* * * * *